United States Patent [19]
Orlowski

[11] 3,941,538
[45] Mar. 2, 1976

[54] APPARATUS FOR FORMING EDIBLE RINGS

[75] Inventor: Gerald J. Orlowski, Calumet Park, Ill.

[73] Assignee: Central Soya Company, Inc., Fort Wayne, Ind.

[22] Filed: June 4, 1973

[21] Appl. No.: 366,432

Related U.S. Application Data
[63] Continuation-in-part of Ser. No. 205,031, Dec. 6, 1971, abandoned.

[52] U.S. Cl. .............. 425/241; 425/311; 425/196
[51] Int. Cl.² .......................................... A21C 5/04
[58] Field of Search .......... 425/218, 231, 241, 240, 425/311, 228, 229, 238; 17/32

[56] References Cited
UNITED STATES PATENTS

| | | | |
|---|---|---|---|
| 206,771 | 8/1878 | Caldwell | 425/218 |
| 1,846,659 | 2/1932 | Roehl et al. | 425/231 X |
| 1,869,005 | 7/1932 | Charnock | 425/231 X |
| 2,000,027 | 5/1935 | Kazanjian | 425/240 X |
| 2,488,046 | 11/1949 | Werner et al. | 425/311 |
| 2,754,774 | 7/1956 | Vogt | 425/241 |
| 2,915,994 | 12/1959 | Wilcox | 425/241 X |
| 3,132,608 | 5/1964 | Leuze | 425/311 |
| 3,899,273 | 8/1975 | Green | 425/241 X |

*Primary Examiner*—Francis S. Husar
*Assistant Examiner*—David S. Safran
*Attorney, Agent, or Firm*—Dawson, Tilton, Fallon & Lungmus

[57] ABSTRACT

An apparatus for forming rings which are made from a formable food mass, made, for example, from onion pieces and a binder. The apparatus includes a hopper for containing the food mass. A rotating cylindrical member is horizontally mounted within the hopper and annular openings are preferably provided in the outer periphery of the cylindrical member for receiving the food mass at a first position. A ring is reciprocally mounted within each of the annular openings, the rings being reciprocated between the loading position and a discharge position, at which the rings are moved towards and beyond the periphery of the cylindrical member. To separate the formed rings from the cylindrical member, a moving cutter is provided near the discharge position.

4 Claims, 7 Drawing Figures

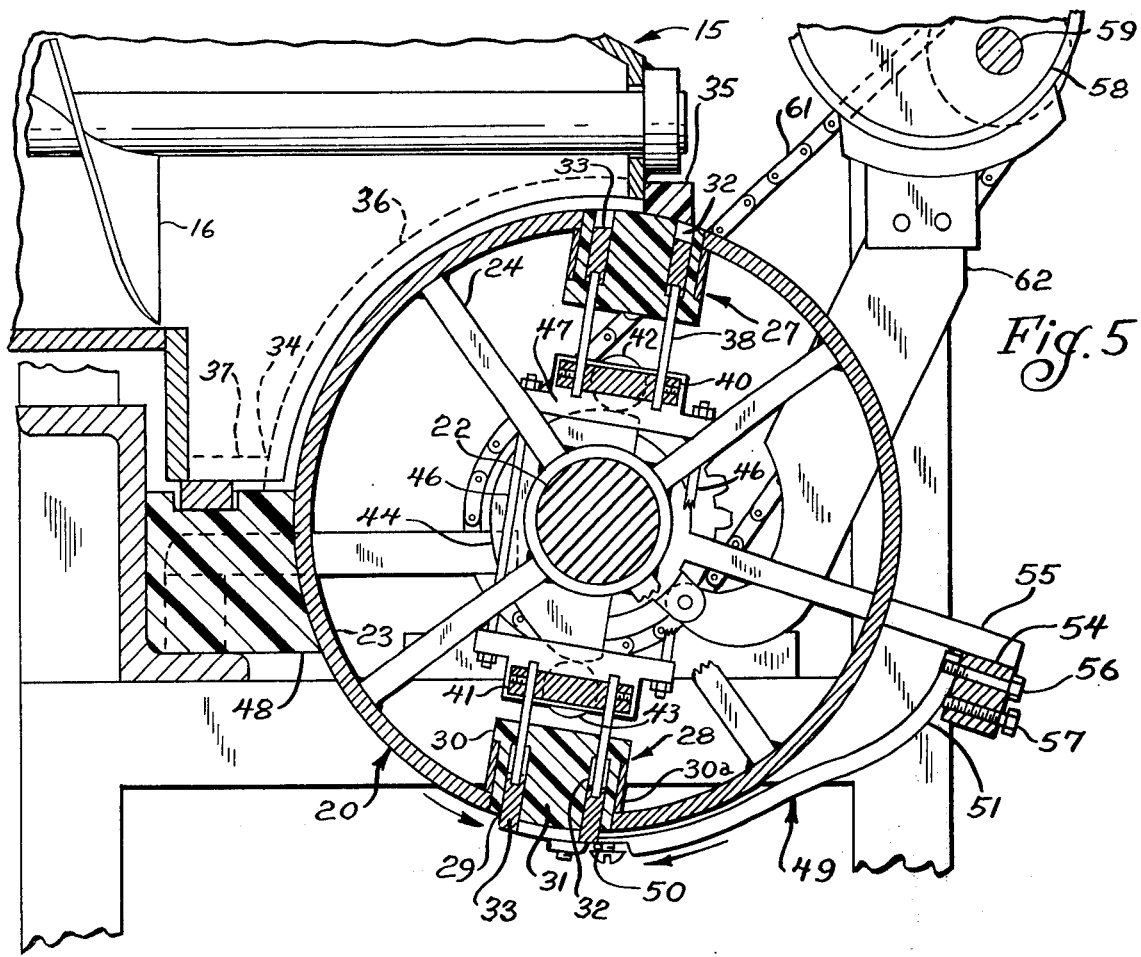
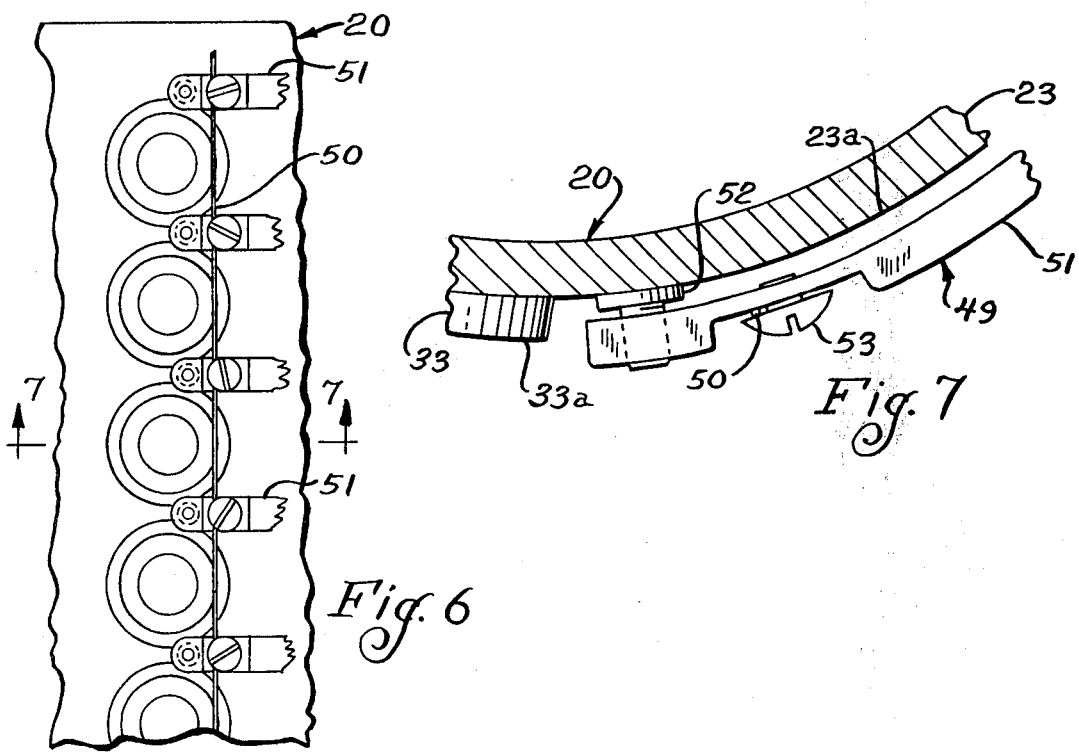

APPARATUS FORMING EDIBLE RINGS

This application is a continuation-in-part of my co-pending application, Ser. No. 205,031 filed Dec. 6, 1971, now abandoned.

BACKGROUND OF THE INVENTION FIELD OF THE INVENTION and DESCRIPTION OF THE PRIOR ART This invention relates to apparatus for forming edible rings and it particularly relates to apparatus for forming a formable food mass, comprising onion pieces and a binder, into a ring shape.

A popular way to prepare and serve onions is in the form of French fried onion rings. French fried onion rings have become so popular that they are now mechanically processed, packaged, and frozen in large quantities for use in restaurants and institutions, as well as in consumer size packages for home use. Such automatic equipment is shown, for example, in my U.S. Pat. No. 3,537,494 wherein fresh unpeeled onions are automatically peeled and sliced, and in my U.S. Pat. No. 3,534,792, wherein the onion slices are further processed by being separated into rings of a desired size. In both of these machines, residual portions of the processed onions are generally surplus as are the onion ends and, the small central portions or hearts of the onions. Methods of utilizing these portions of the onion are known. Generally, this consists of reducing these onion pieces as well as chopped whole onions to a desired size and then mixing the same with a binder to create a formable food mass. Onion rings of the desired size are then made from the food mass. Preferably, automatic equipment is used to form the food mass into the desired shape. Although food processing equipment is known for shaping an edible material into the desired size and configuration including various forming and extruding devices, such as that described in U.S. Pat. Nos. 3,650,765 and 3,650,766, the instant invention provides significant advantages over the prior art.

SUMMARY OF THE INVENTION:

It is therefore an important object of this invention to provide a unique apparatus for forming rings from a formable food mass comprising onion pieces and a binder.

It is a further object of this invention to provide apparatus for forming rings, useful for processing into French fried onion rings, from a formable edible mass comprising pieces of onions and a binder.

It is also an object of this invention to provide an apparatus for forming onion rings from a food mass of onion pieces and a binder wherein the rings formed are substantailly true rings without undesirable deformations thereof.

It is a further object of this invention to provide an apparatus for forming rings from a food mass of onion pieces in a binder wherein the food mass is packed into an annular opening in a rotatable member and the formed ring is discharged by a moving ring member which is located within the annular opening to a discharge position from where the formed onion ring is discharged from the rotating member by a novel shearing action.

It is another object of this invention to provide apparatus for forming rings from a formable food mass comprising onion pieces in a binder wherein the apparatus is characterized by its effectiveness and efficiency in operation and result.

It is yet another object of this invention to provide an apparatus for forming rings from an edible, formable mass, wherein the apparatus is characterized by high speed production, with resulting high quality and economical cost of the product.

Further purposes and objects of this inventiown will appear as the specification proceeds.

The foregoing objects are fulfilled by providing an apparatus which forms an edible product from a formable food mass which comprises, for example, onion pieces in a binder wherein the apparatus includes a hopper for containing the food mass, and a rotating horizontally elongated cylindrical member which is mounted within the hopper, the elongated cylindrical member having a plurality of openings in its outer periphery for receiving the food mass at a first or loading position. A movable member is reciprocally mounted in each of the annular openings and an operating member is provided for reciprocating the movable member between the loading position and the discharge position where the product is ejected from the openings by the movable members. A movable cutter member, is mounted adjacent the outer periphery of the cylindrical member at the discharge position to assure that the formed product is properly separated and discharged from the opening without any substantial deformation.

BRIEF DESCRIPTION OF THE DRAWINGS:

Particular embodiments of the present invention are illustrated in the accompanying drawings wherein:

FIG. 5 is a seciional view of the structure of FIG. 3;

FIG. 6 is a fragmentary elevational view of the cutter element employed in the practice of the invention; and FIG. 7 is an enlarged, fragmentary cross-sectional view taken along the line 7—7 of FIG. 6.

DETAILED DESCRIPTION OF THE PREFERRED EMBODIMENT:

In the following description of the invention, the edible mass used for forming edible rings is described as a formable food mass of onion pieces and a binder. Although the apparatus described has its preferred and most important application in making such formed onion rings, it is to be understood that the described invention can be used to make a variety of formed edible products of a selected size and shape.

Figure 1:
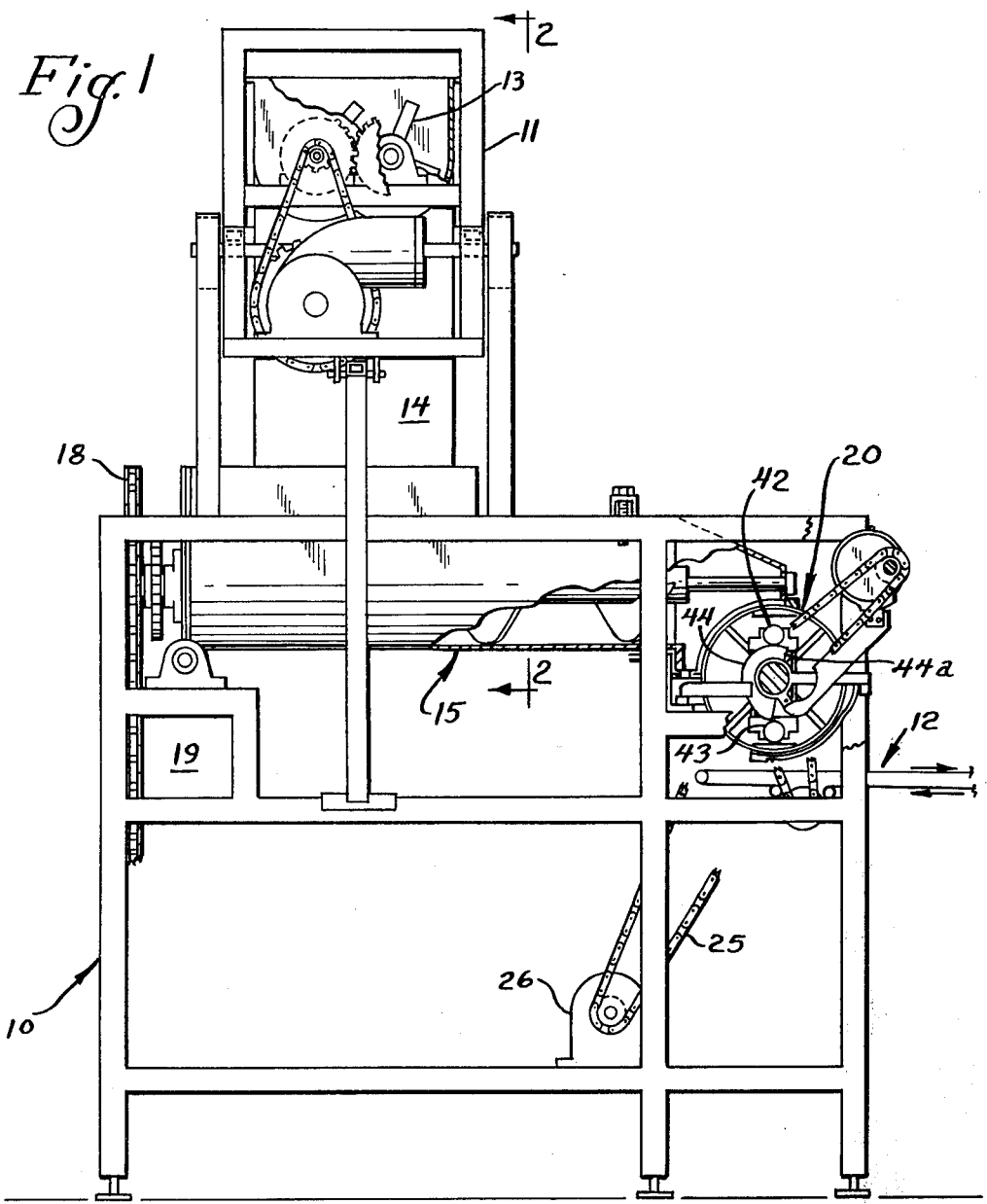
FIG. 1 is a side elevational view of the inventive apparatus, partially broken away and in section.

In the drawing and with particular reference to FIG. 1, the numeral 10 designates generally a frame for supporting the operational elements of the inventive apparatus. Rigidly mounted on the frame as at 11 is a superstructure intended to receive the formable food mass from a conveyor, chute or the like (not shown).

At the middle right hand portion of FIG. 1 is seen an output conveyor generally designated 12 which is supported in part by the frame 10 and which serves to convey the formed onion rings or like product from the frame 10 — for further processing, i.e., breading, packaging, etc.

Figure 2:
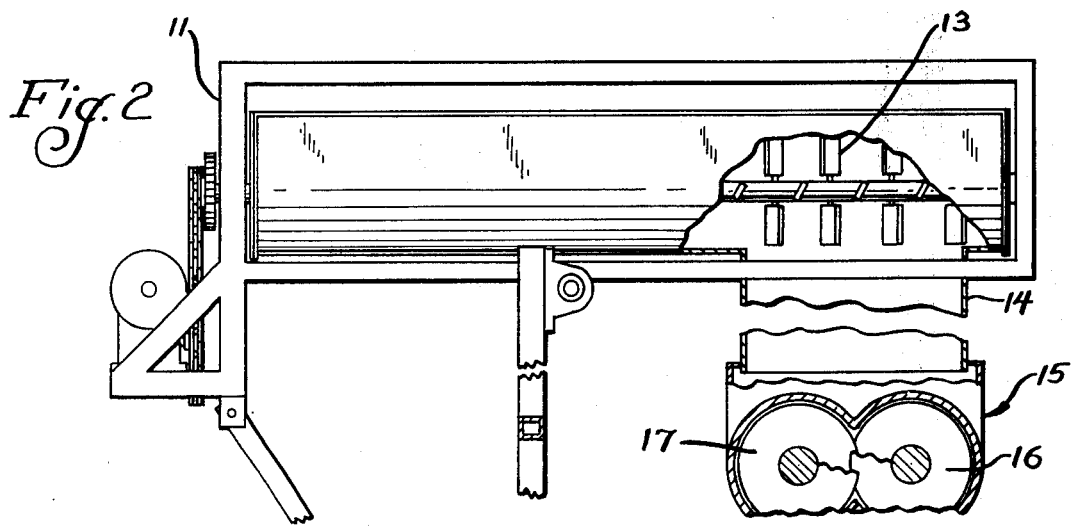
FIG. 2 is a cross-sectional view taken along the line 2—2 of FIG. 1.

Referring again to the superstructure 11, seen in FIG. 1, means in the form of mixing paddles 13 are provided for advancing the mass and mixing the same prior to downward movement through conduit 14 into a hopper generally designated 15 (and shown in the central portion of FIG. 1). The hopper 15 can also be seen in the lower right hand portion of FIG. 2 and includes a pair of opposed, interleaved augers 16 and 17 suitably driven by a chain drive 18 (see the left hand central portion of FIG. 1) from a motor 19. The augers serve to compact the mass while advancing the same toward the cylindrical former generally designated 20 and which is the subject of a more detailed explanation in conjunction with FIGS. 3-7.

Referring now to FIG. 5, the cylindrical former 20 is seen to be partially received within the hopper 15, i.e., forming a portion of the lower and end discharge walls — at a position spaced away from the conduit 14 which serves as an inlet to the hopper 15.

Figure 3:
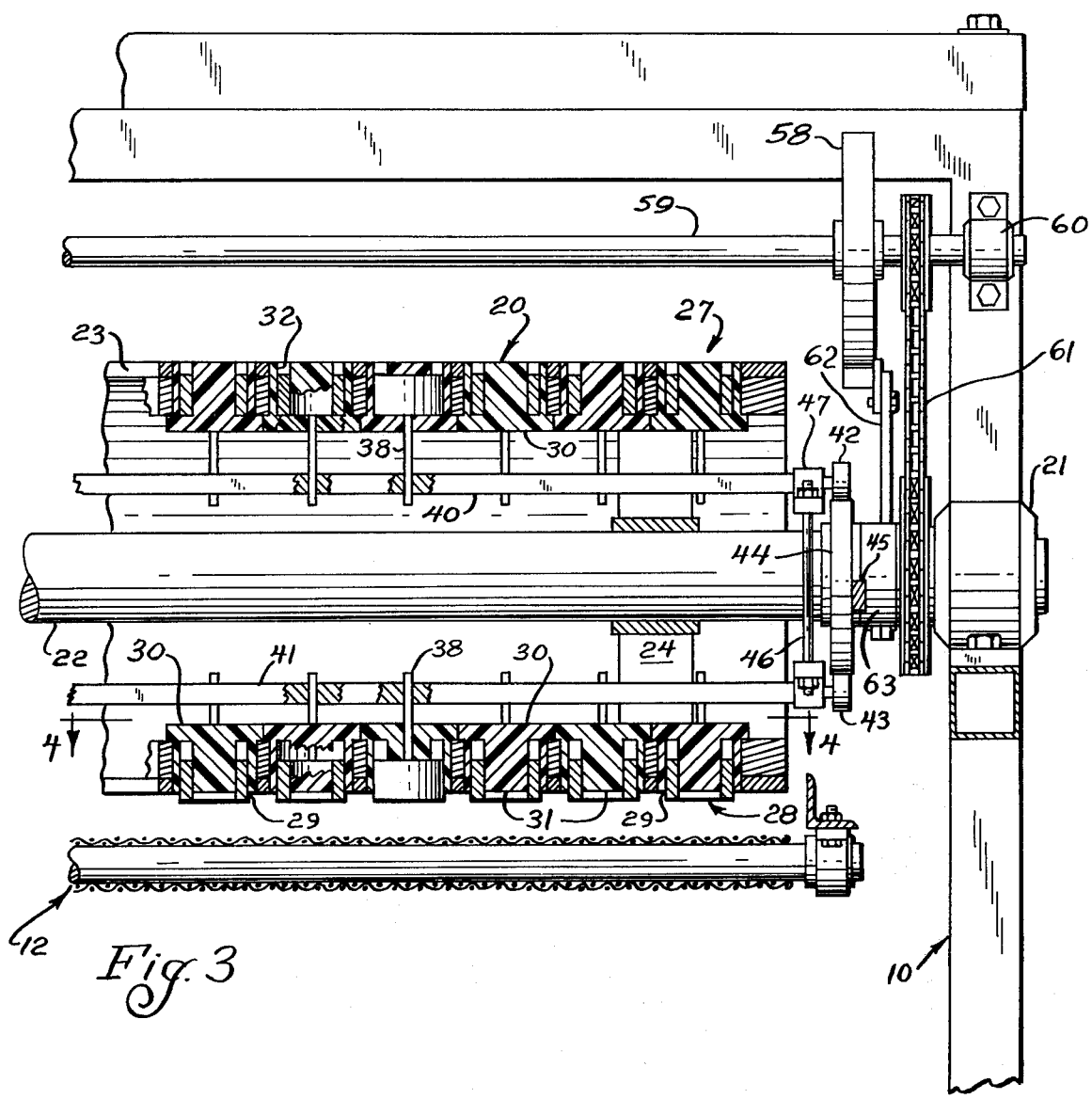
FIG. 3 is a fragmentary cross-sectional view of the horizontally disposed rotatable cylinder.
Figure 4:
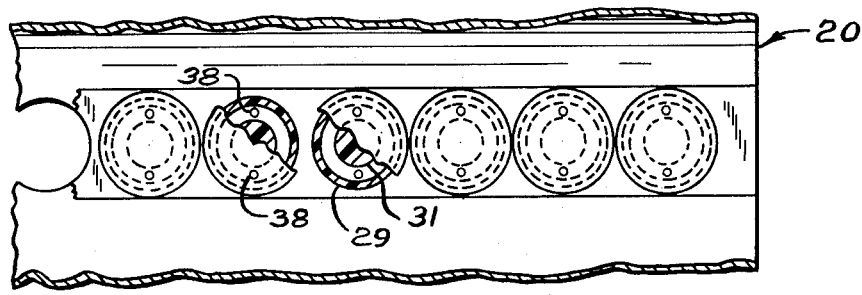
FIG. 4 is a fragmentary view partially in section taken along the line 4—4 of FIG. 3.

As can be appreciated from a consideration of FIG. 3, the cylindrical former 20 is rotatably mounted on the frame 10 — for this purpose suitable bearings as at 21 (see the right central portion of FIG. 3) are provided which journal the cylinder shaft 22. The cylinder periphery or exterior 23 (see also FIG. 5) is rigidly secured to the shaft 22 by means of a spider-structure 24 provided adjacent each end of the cylindrical former 20. Each spider 24 includes a plurality of radially extending spokes which are rigidly secured to a concentric central hub which in turn is non-rotatably secured to the shaft 22. At their outer ends, the spokes of the spider 24 are welded to the exterior or shell of the cylindrical former 20. The cylinderical former 20 is rotated by means of a chain drive 25 (see the lower right hand portion of FIG. 1) which derives power from a motor 26 mounted on the frame 10.

As can be most quickly seen in FIG. 5, the cylindrical former 20 carries opposed mold members generally designated 27 and 28. A plurality of mold members are provided in each set as can be appreciated from a further consideration of FIG. 3. The mold members 27 are in a condition to receive the formable mass, i.e., entering into the interior of the hopper 15, while the mold members 28 are in the condition for discharge and removal of the formed mass, i.e., the onion rings.

The shell 23 of the cylindrical former 20 is equipped with two pluralities or sets of axially aligned openings 29. An opening 29 is provided for each of the mold members 27 or 28. Each mold member 27 or 28 includes a plastic member 30 which advantageously is constructed of nylon and is suitable secured (as by a metal ring 30a) within each opening 29. More specifically, the plastic member or plug has a central core or boss 31 which, with the remainder of the member 30 forms an annular well 32 (see FIG. 5). A reciprocable ring assembly 33 is slidably carried within each of the wells 32.

As can be conveniently appreciated from FIG. 5, the ring assembly 33 of the mold member 27 is retracted incident to receiving a formable mass from the hopper 15 while the ring assembly 33 of the mold member 28 (approaching the 6 o'clock position) is extended so as to position the formed mass for shear removal and deposit onto the conveyor 12.

To introduce the formable mass into the mold member 27 (approaching the 12 o'clock position), the hopper 15 has an elongated opening 34 (see FIG. 5) provided in the lower portion thereof. The cylindrical former 20 closes the opening 34 and the periphery of the cylindrical former 20 engages seals 35, 36 and 37 positioned about the perimeter of the opening 34. It will be appreciated that after ½ revolution of the cylindrical former 20, the positions of the mold members 27 and 28 are reversed, i.e., the ring assembly 33 of the mold member 28 will be retracted while that of the mold member 27 will be extended. More precisely, mechanism is provided which causes a retraction of each ring assembly 33 as the 12 o'clock position is approached an extension of the ring assembly 33 as the 6 o'clock position is approached.

Each recriprocating ring assembly 33 includes a transverse ring position which slides within the well 29 and in close proximity to the walls thereof. A pair of connecting rods 38 (see also FIG. 4) are rigidly secured to the interface of each ring assembly 33 and extend through apertures 39 provided in the inner end of each of the members 30. A cross bar as at 40 and 41 relative to the mold members 27 and 28, respectively (see FIG. 3) interconnects the inner ends of each of the connecting rods 38. The axially extending cross bars 40 and 41 extend out of the ends of the cylindrical former 20 (see the right hand end of FIG. 3) and carry cam follower rollers 42 and 43, respectively.

The cam followers 42 and 43 operate against the periphery of a cam 44. The cam 44 is rigidly mounted on the frame 10 by means of a bracket or connection 45 (seen only in FIG. 3). The bars 40 and 41 are maintained in spaced relation by tie members 46 (see particularly FIG. 5). Thus, as one bar 40 or 41 moves in, the other bar 41 or 40 moves outwardly — as determined by the profile of the cam. It will be noted that a segment of the cam is cut away (as at 44a in FIG. 1). This portion of the cam is unnecessary because the remaining portion of the cam dictates the position of the two cam followers 42 and 43, hence the positions of the bars 40 and 41. The bars 40 and 41 are fixed within brackets as at 47 which are fixed to the tie rods 46 so that the predetermined spacing of the bars 40 and 41 is maintained. Thus, as the cam follower 42 moves further counterclockwise (see FIG. 5) the ring assembly 33 associated with the mold member 27 remains retracted until the cam follower 42 is passed the 9 o'clock position. Further rotation of the cylindrical former 20 brings about the extension of the ring assembly 33 relative to the plug 30 with the corresponding retraction of the ring assembly 33 of the mold member 28. By the time the 6 o'clock position is being approached, the ring assembly 33 of whichever mold member is involved is fully extended and protrudes beyond the periphery of the cylindrical former 20 while, at the same time, the opposite set of ring assemblies are fully retracted so as to receive a charge of formable material.

The formable material is effectively doctored by means of a wiper assembly 48 (see particularly FIG. 5). The doctor assembly has a substantial width, i.e., the arcuate dimension measured in the direction of rotation of the cylindrical former 20. The width (as so measured) is greater than the diameter of the annular well 32 so that the material within the well at the time the well is aligned with the wiper 48 is fully confined. It will be appreciated that a relatively narrow wiper might force a portion of the mass to be formed out of the trailing portion of the well.

Still referring to FIG. 5, reference is now made to the shearing assembly generally designated 49. The assembly 49 includes as an essential operative element a wire 50 (also seen in FIGS. 6 and 7). The wire 50 is maintained in spaced relation to the outer surface 23a of the shell 23 so as to pass within about 0.001 inch of the outer surface 33a of each ring assembly 33 (see FIG. 7). This insures full removal of the now-formed mass and under conditions minimizing any distortion of the desired ring form. I find it advantageous in developing this shearing action to have the shearing wire 50 mounted for oscillation, thereby achieving a clean cut separation of the formed ring from the surface 33a of each ring assembly 33. The illustrated and preferred means for mounting the shearing wire 50 is best seen in FIG. 6. The wire 50 is seen to be secured at a plurality of places to arms 51. This minimizes the possibility that the wire may be deformed along any substantial length thereof. For example, it is not unusual for an onion peel or the like to become lodged between the wire 50 and the outer surface 23a of the cylindrical former 20. With a wire supported only at the ends of the cylindrical former 20, such an onion peel would result in bowing of the entire wire and thereby frustrate the achievement of clean shearing. By the practice of securing the wire on each side of each molding member 27 or 28, as the case may be, I limit any distortion to just the two oppositely disposed mold in question.

The unsupported end of each arm 51 is equipped with a bearing element 52 (see particularly FIG. 7) which maintains the spacing of the wire 50 relative to the outer surface 23a. I also have found it advantageous to clamp the wire 50 to the various arms 51 by means of set screws as at 53. The secured end of each arm 51 is seen in FIG. 5 and for this purpose I provide a block 54 mounted on the end of a rocker member 55. As seen in FIG. 5, the block 54 is equipped with a bolt 56 for each arm 51 to secure the same to the block. An additional bolt 57 is provided which regulates the disposition of the arms 51 relative to the block and can apply a biasing pressure to the arm which pressure is resisted by the contact of the bearing element 52 (see FIG. 7) with the outer surface 23a of the shell 23.

Oscillation of the wire 50 is produced by means of an eccentric 58 (see the upper right hand portion of FIG. 5). The eccentric 58 is mounted on a cross shaft 59 (see also FIG. 3) which is suitably journaled within pillow blocks 60 on the frame 10. The shaft 59 is rotated because of a chain and sprocket linkage 61 with the shaft 22 of the cylindrical former 20. The eccentric 58 is connected by means of a linkage 62 with a collar 63 (see FIG. 3) rotatably mounted on the cross shaft 22. The collar 63 has as an integral projection thereon the rocker member 55. Thus, as the shaft 59 rotates an oscillatory motion is developed in the collar 63 which results in the alternation or like oscillation of the wire 50.

OPERATION

In the operation of the inventive apparatus, the formable mass is introduced into the superstructure 11 and through conduit 14 enters the closed hopper 15. Under the influence of the augers 16 and 17 which are intermeshed and which turn in opposite directions, a continual stream of material is delivered toward the cylindrical former 20.

As a given mold member 27 (see FIG. 5) of the cylindrical former 20 rotates under the outlet 34 of the hopper 15, material to be formed flows into the annular well 32. The well 32 exists by virtue of the retraction of the associated ring assembly 33. The ring assembly 33 is tied by means of rods 38 to an axially extending bar 40 (see FIG. 3) which in turn is tied with an oppositely disposed bar 41. Thus, the bars 40 and 41 operate in tandem by virtue of the cam followers 42 and 43 riding against the profile of the cam 44. Because of the contour of the cam 44, as the ring assembly 33 associated with the mold member 27 is retracted, the ring assembly 33 associated with the other set of mold members 28 is extended — to project beyond the periphery 23a of the shell 23 of the cylindrical former 20 (see the lowermost portion of FIG. 5 — also FIG. 7).

As the cylindrical former 20 continues to rotate in a counterclockwise direction, it encounters a wiper 48 having a sufficient arcuate length to completely overlap a ring assembly 33 so as to prevent the development of distorted rings. As the rotation continues and the axially aligned group of mold members 27 or 28, as the case may be, pass from the 9 o'clock position toward the 6 o'clock position, the associated ring assemblies 33 begin to emerge incident to ejecting now-formed rings. I have found it advantageous to have the extension of the ring assembly 33 occur at just before the 6 o'clock position so that in combination with the shearing wire 50, there will be no upward component of the ring as it is sheared from the outer surface 33a of the projecting ring assembly (see FIG. 7). In other words, the separated ring has as its direction of movement one that is essentially parallel to the direction of movement of the output conveyor 12. with any upward component at the time of discharge, the rear edge of the ring may be the first to contact the conveyor 12 and thus result in deformation.

As mentioned just previously, the separation is achieved through the cooperation of a shearing wire 50 with the outer surface 33a of the projecting ring assembly 33 (see FIG. 7). The spacing of the wire a discrete distance radially outward of the outer surface 23a of the shell 23 is achieved through the use of a bearing 52 which advantageously may take the form of a nylon bolt threadably received in the free end of each arm 51. The other end of each arm 51 is connected to a rocker element 55 which rocks or oscillates under the influence of the eccentric 58. The biasing of the generally arcuate arm 51 can be regulated by means of the set screw or bolt 57.

Each mold member 27 or 28 includes a block or plug 30, preferably of nylon, which has a central boss defining the annular well 32. By virtue of having the ring assembly project beyond the plug 30 at the time of shear by the wire 50, I effectively avoid any scraping of the nylon plug 30. This insures that there will be minimum deterioration of each molding member and, more importantly, the avoidance of any undesirable plastic shavings in the final product.

The wire 50 is seen to be supported at a plurality of places (see FIG. 6), optimally, on each side of each of the mold members. Especially reliable operation is achieved when only 2 rows, 180° apart, of mold members are employed. This permits the use of simple and rugged camming arrangements at each end of the cylindrical former so that the movement of the ring assemblies 33 is carefully controlled.

I claim:

1. In apparatus for forming edible products from edible formable mass comprising in combination, a hopper containing said mass, a cylindrical member rotatably mounted about a horizontal axis and defining peripheral cavity means cooperating with said hopper for receiving a portion of said mass at a loading station and for discharging the same at a discharge station, a movable plunger member mounted for reciprocation within said cavity means, means for reciprocating said plunger member between a retracted position when said cavity means of said cylindrical member is at said loading station for receiving said mass portion, and an extended position when said cavity means is at said discharge station for discharging said mass from said cavity means, the improvement comprising: means for extending the distal end of said plunger member a predetermined distance beyond the outer surface of said cylindrical member when said plunger member is in said extended position; a remover member including a wire extending parallel to the axis of said cylindrical member adjacent the discharge position for separating a formed product from said plunger member at said discharge station when said plunger member is reciprocated to said extended position; spacer means slidably contacting the surface of said cylindrical member for holding said wire outwardly of said cylindrical member by said predetermined distance; means for oscillating said remover member in a direction opposite to the direction of rotation of said cylindrical member when said cavity means is adjacent said discharge station, whereby said remover member removes said formed product by moving said wire in a direction opposite to the peripheral motion of said cylindrical member; and means for returning said remover member to its original position after a formed product has been moved from said plunger member.

2. The apparatus of claim 1 wherein said loading station is located adjacent the upper portion of said cylindrical member, and said discharge station is located adjacent the bottom of the periphery of said cylindrical member.

3. The apparatus of claim 1 wherein said cavity means includes a plurality of annular openings arranged in two rows spaced at diametrically opposite peripheral locations of said cylindrical member, each row extending generally parallel to the axis thereof.

4. An apparatus for forming edible products from edible formable mass, said apparatus comprising in combination, a hopper containing said mass, a cylindrical member rotatably mounted about a horizontal axis and defining peripheral cavity means cooperating with said hopper for receiving a portion of said mass at a loading station and for discharging the same at a discharge station, a movable member mounted for reciprocation within said cavity means, means for reciprocating said movable member between a retracted position when said cavity means of said cylindrical member is at said loading station for receiving said mass portion, and an extended position when said cavity means is at said discharge station for discharging said mass from said cavity means, a movable remover member defining a leading edge spaced from the periphery of said cylindrical member adjacent the discharge position, and including a plurality of arms disposed adjacent the periphery of said cylindrical member, a wire secured adjacent the ends of said arms adjacent said cylindrical member and extending parallel to the axis of said cylindrical member, and bearing means on said arms slidably engaging said cylindrical member for maintaining said wire in fixed spaced relation to the periphery of said cylindrical member, and means for driving said remover member in a direction opposite to the direction of rotation of said cylindrical member when said movable member is adjacent said discharge station to cause said remover member to separate said formed product from said movable member when said movable member is in said extended position.

* * * * *